United States Patent
Adler et al.

(10) Patent No.: US 10,475,327 B2
(45) Date of Patent: *Nov. 12, 2019

(54) SMART LOCATION-BASED REMINDERS

(71) Applicant: Apple Inc., Cupertino, CA (US)

(72) Inventors: Scott Adler, Saratoga, CA (US); Viktor Miladinov, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,480

(22) Filed: Mar. 7, 2019

(65) Prior Publication Data
US 2019/0206225 A1 Jul. 4, 2019

Related U.S. Application Data

(63) Continuation of application No. 14/863,315, filed on Sep. 23, 2015, now Pat. No. 10,235,863.

(60) Provisional application No. 62/171,925, filed on Jun. 5, 2015.

(51) Int. Cl.
*G08B 21/24* (2006.01)
*H04W 4/02* (2018.01)
*G06Q 10/10* (2012.01)

(52) U.S. Cl.
CPC ............ *G08B 21/24* (2013.01); *G06Q 10/10* (2013.01); *H04W 4/02* (2013.01)

(58) Field of Classification Search
None
See application file for complete search history.

(56) References Cited

U.S. PATENT DOCUMENTS

| 5,541,981 | A | 7/1996 | Lynn |
| 6,265,974 | B1 | 7/2001 | D'Angelo et al. |
| 7,424,545 | B2 | 9/2008 | Ducheneaut et al. |
| 7,889,101 | B2 | 2/2011 | Yokota |
| 8,050,665 | B1 | 11/2011 | Orbach |
| 8,054,180 | B1 | 11/2011 | Scofield et al. |
| 8,245,252 | B2 | 8/2012 | Gee |

(Continued)

FOREIGN PATENT DOCUMENTS

| EP | 2469303 | 6/2012 |
| EP | 2665023 | 11/2013 |

(Continued)

OTHER PUBLICATIONS

"Launch Files & Applications on a Scheduled Date with Calendar for Mac OS X", Osx Daily, Available Online at http://osxdaily.com/2013/04/15/1aunchfile-app-scheduled-date-mac-os-x, Apr. 15, 2013, 5 pages.

(Continued)

*Primary Examiner* — Chico A Foxx
(74) *Attorney, Agent, or Firm* — Kilpatrick Townsend & Stockton LLP

(57) ABSTRACT

A method and device for providing a reminder to a user of a mobile device are provided. A location of the mobile device is monitored to identify whether the first geographical area is triggered by the mobile device crossing a first boundary of the first geographical area. After the mobile device crosses the first boundary the first location-based reminder is identified and a state of the mobile device is determined. The first location-based reminder can be provided to the user when an opportune event occurs.

20 Claims, 10 Drawing Sheets

(56) References Cited

U.S. PATENT DOCUMENTS

| | | |
|---|---|---|
| 8,341,241 B2 | 12/2012 | Meuninck et al. |
| 8,375,320 B2 | 2/2013 | Kotler et al. |
| 8,385,944 B1* | 2/2013 | Nelissen .............. H04W 4/021 455/456.3 |
| 8,416,073 B1 | 4/2013 | Scofield et al. |
| 8,629,767 B2 | 1/2014 | Stefanovski et al. |
| 8,686,852 B2 | 4/2014 | Ben-Dayan et al. |
| 8,838,138 B2 | 9/2014 | Modali et al. |
| 8,941,478 B2 | 1/2015 | Mirle et al. |
| 9,122,542 B1 | 9/2015 | Nelissen |
| 9,215,559 B2 | 12/2015 | Dave et al. |
| 9,247,387 B2 | 1/2016 | Bonanni et al. |
| 9,262,605 B2 | 2/2016 | Kim et al. |
| 9,319,843 B2 | 4/2016 | Lerenc |
| 9,327,645 B2 | 5/2016 | Raman et al. |
| 9,489,247 B2 | 11/2016 | Evans |
| 9,506,773 B1 | 11/2016 | Cherubini et al. |
| 9,552,717 B1 | 1/2017 | Rudolph |
| 9,554,050 B2 | 1/2017 | Dave et al. |
| 9,603,123 B1 | 3/2017 | Jackson et al. |
| 9,621,661 B2* | 4/2017 | Diem .................. G06Q 10/00 |
| 9,961,618 B2 | 5/2018 | Abraham et al. |
| 10,051,109 B2 | 8/2018 | Jackson et al. |
| 10,182,305 B2* | 1/2019 | Gillen ................. H04W 4/02 |
| 2001/0028304 A1 | 10/2001 | I'Anson et al. |
| 2001/0029194 A1 | 10/2001 | Ketola et al. |
| 2002/0086680 A1 | 7/2002 | Hunzinger |
| 2005/0102607 A1 | 5/2005 | Rousselle et al. |
| 2005/0190080 A1 | 9/2005 | Flick |
| 2006/0077055 A1 | 4/2006 | Basir |
| 2006/0156209 A1* | 7/2006 | Matsuura .............. G06Q 10/10 714/798 |
| 2006/0195518 A1 | 8/2006 | Neilsen |
| 2006/0218029 A1 | 9/2006 | Chin |
| 2006/0273930 A1 | 12/2006 | Godden |
| 2007/0115837 A1 | 5/2007 | Elie-Dit-Cosaque et al. |
| 2007/0132836 A1 | 6/2007 | Katz |
| 2007/0241885 A1 | 10/2007 | Clipsham |
| 2008/0046965 A1* | 2/2008 | Wright ................ G06F 21/32 726/1 |
| 2008/0079566 A1 | 4/2008 | Singh et al. |
| 2008/0140795 A1 | 6/2008 | He et al. |
| 2008/0150959 A1 | 6/2008 | Marui |
| 2008/0287119 A1 | 11/2008 | Yasuda |
| 2009/0077159 A1 | 3/2009 | Murakami |
| 2009/0212936 A1 | 8/2009 | Granatelli et al. |
| 2009/0249222 A1 | 10/2009 | Schmidt et al. |
| 2009/0287418 A1 | 11/2009 | Trepagnier et al. |
| 2010/0026526 A1 | 2/2010 | Yokota et al. |
| 2010/0161720 A1* | 6/2010 | Colligan ............. G06Q 30/02 709/203 |
| 2010/0190513 A1* | 7/2010 | Andreasson ........... H04W 4/02 455/456.3 |
| 2010/0295676 A1* | 11/2010 | Khachaturov ......... G08B 21/24 340/540 |
| 2010/0298656 A1 | 11/2010 | Mccombie et al. |
| 2011/0004885 A1 | 1/2011 | Kikuchi et al. |
| 2011/0084807 A1 | 4/2011 | Logan et al. |
| 2011/0185029 A1 | 7/2011 | Jain et al. |
| 2011/0314124 A1 | 12/2011 | Gimson |
| 2011/0314404 A1 | 12/2011 | Kotler et al. |
| 2012/0001843 A1 | 1/2012 | Gravino |
| 2012/0029964 A1 | 2/2012 | Tengler et al. |
| 2012/0069388 A1 | 3/2012 | Nakatani et al. |
| 2012/0077463 A1 | 3/2012 | Robbins et al. |
| 2012/0155263 A1 | 6/2012 | Long |
| 2012/0197523 A1 | 8/2012 | Kirsch |
| 2012/0222009 A1 | 8/2012 | Ayewah et al. |
| 2012/0242482 A1 | 9/2012 | Elumalai et al. |
| 2012/0244814 A1 | 9/2012 | Okayasu |
| 2012/0265535 A1 | 10/2012 | Bryant-Rich et al. |
| 2012/0299717 A1 | 11/2012 | Yoshino et al. |
| 2012/0302258 A1 | 11/2012 | Pai et al. |
| 2012/0316456 A1 | 12/2012 | Rahman et al. |
| 2013/0138622 A1 | 5/2013 | Ayers et al. |
| 2013/0244633 A1 | 9/2013 | Jacobs et al. |
| 2013/0245986 A1 | 9/2013 | Grokop et al. |
| 2013/0257604 A1 | 10/2013 | Mirle et al. |
| 2013/0260784 A1 | 10/2013 | Lutz |
| 2013/0307681 A1 | 11/2013 | Borg et al. |
| 2013/0316720 A1 | 11/2013 | Dwyer et al. |
| 2013/0324093 A1 | 12/2013 | Santamaria et al. |
| 2013/0324160 A1 | 12/2013 | Sabatellil et al. |
| 2013/0336258 A1 | 12/2013 | Young et al. |
| 2014/0009285 A1 | 1/2014 | Khachaturov et al. |
| 2014/0012117 A1 | 1/2014 | Mensinger et al. |
| 2014/0033071 A1 | 1/2014 | Gruber et al. |
| 2014/0099921 A1 | 4/2014 | Weiss |
| 2014/0118272 A1 | 5/2014 | Gunn |
| 2014/0155097 A1* | 6/2014 | Tucker ................. H04W 4/02 455/456.3 |
| 2014/0207570 A1 | 7/2014 | Cancro et al. |
| 2014/0248910 A1 | 9/2014 | Dave et al. |
| 2014/0253314 A1* | 9/2014 | Rambadt ............. B60N 2/002 340/457.1 |
| 2014/0253320 A1 | 9/2014 | Bender |
| 2014/0266810 A1 | 9/2014 | Hatton |
| 2014/0269363 A1 | 9/2014 | Lee et al. |
| 2014/0274203 A1 | 9/2014 | Ganong, III et al. |
| 2014/0280439 A1 | 9/2014 | Hatton |
| 2014/0280580 A1 | 9/2014 | Langlois et al. |
| 2014/0282606 A1 | 9/2014 | Clark et al. |
| 2014/0282721 A1* | 9/2014 | Kuncl ................. H04N 21/4524 725/35 |
| 2014/0283074 A1 | 9/2014 | Sohn et al. |
| 2014/0304363 A1 | 10/2014 | Mhatre et al. |
| 2014/0342718 A1 | 11/2014 | Chen et al. |
| 2014/0344446 A1 | 11/2014 | Rjeili et al. |
| 2014/0351832 A1 | 11/2014 | Cho et al. |
| 2015/0005978 A1 | 1/2015 | Nakakita et al. |
| 2015/0015409 A1* | 1/2015 | Won .................... G08B 21/24 340/815.4 |
| 2015/0061896 A1 | 3/2015 | Walther et al. |
| 2015/0080031 A1* | 3/2015 | Moldavsky ........... H04W 4/02 455/456.3 |
| 2015/0092928 A1 | 4/2015 | Jensen et al. |
| 2015/0105106 A1* | 4/2015 | Masterman .......... H04W 68/00 455/456.3 |
| 2015/0137996 A1 | 5/2015 | Terashima |
| 2015/0143281 A1 | 5/2015 | Mehta et al. |
| 2015/0164437 A1 | 6/2015 | Mccombie et al. |
| 2015/0181511 A1 | 6/2015 | Abraham et al. |
| 2015/0237475 A1* | 8/2015 | Henson ............... H04W 4/021 455/456.3 |
| 2015/0319579 A1* | 11/2015 | Syrjarinne ............ G01C 21/20 455/456.1 |
| 2015/0350413 A1 | 12/2015 | Ma et al. |
| 2015/0358766 A1* | 12/2015 | McDevitt ........... G06Q 30/0261 705/14.58 |
| 2015/0370884 A1 | 12/2015 | Hurley et al. |
| 2016/0035213 A1* | 2/2016 | Choi ................... H04L 63/107 340/669 |
| 2016/0037482 A1* | 2/2016 | Higgins .............. H04W 68/005 455/414.1 |
| 2016/0062570 A1 | 3/2016 | Dascola et al. |
| 2016/0077674 A1 | 3/2016 | Forster et al. |
| 2016/0086141 A1 | 3/2016 | Jayanthi et al. |
| 2016/0117928 A1 | 4/2016 | Hodges et al. |
| 2016/0156773 A1 | 6/2016 | Chanda |
| 2016/0165381 A1 | 6/2016 | Kapoor et al. |
| 2016/0187452 A1 | 6/2016 | Schillings |
| 2016/0203018 A1 | 7/2016 | Deluca et al. |
| 2016/0203497 A1 | 7/2016 | Tietzen et al. |
| 2016/0241542 A1 | 8/2016 | Kim et al. |
| 2016/0284199 A1* | 9/2016 | Dotan-Cohen ....... G08B 21/24 |
| 2016/0309310 A1 | 10/2016 | Herman et al. |
| 2016/0342694 A1 | 11/2016 | Allen et al. |
| 2016/0343233 A1 | 11/2016 | Wassef et al. |
| 2016/0349953 A1 | 12/2016 | Adler et al. |
| 2016/0350306 A1 | 12/2016 | Hurley et al. |
| 2016/0358451 A1 | 12/2016 | Adler et al. |
| 2017/0013464 A1 | 1/2017 | Fish et al. |

(56) References Cited

U.S. PATENT DOCUMENTS

| | | |
|---|---|---|
| 2017/0041025 A1 | 2/2017 | Murakami et al. |
| 2017/0048376 A1 | 2/2017 | Logan |
| 2017/0053287 A1 | 2/2017 | Kannan et al. |
| 2017/0162016 A1 | 6/2017 | Olson |
| 2017/0238138 A1 | 8/2017 | Aminzade |
| 2017/0263101 A1* | 9/2017 | Funakoshi ........... G08B 21/182 |
| 2019/0114326 A1 | 4/2019 | Agrawal |

FOREIGN PATENT DOCUMENTS

| | | |
|---|---|---|
| WO | 2012022021 | 2/2012 |
| WO | 2014209374 | 12/2014 |
| WO | 2016196092 | 12/2016 |
| WO | 2016197060 | 12/2016 |

OTHER PUBLICATIONS

"Siri vs. Cortana—Happy Anniversary (Commercial)", Nokia Iran, Available Online at: https://www.youtube.com/watchv=8e8rZxRpMlo, Jul. 28, 2014, 1 page.

"Trigger", EgoMotion, Product Data Sheet, Available Online at: <https:iNJWW.google.comigws_rd::ssl#q::Trigger+EgoMotion, 2015, 5 pages.

U.S. Appl. No. 14/863,315 , "Advisory Action", dated Oct. 17, 2018, 5 pages.

U.S. Appl. No. 14/863,315 , "Advisory Action", dated Dec. 21, 2017, 6 pages.

U.S. Appl. No. 14/863,315 , "Corrected Notice of Allowability", dated Nov. 13, 2018, 2 pages.

U.S. Appl. No. 14/863,315 , "Final Office Action", dated Aug. 25, 2017, 18 pages.

U.S. Appl. No. 14/863,315 , "Final Office Action", dated Jun. 28, 2018, 20 pages.

U.S. Appl. No. 14/863,315 , "Non-Final Office Action", dated Feb. 8, 2018, 20 pages.

U.S. Appl. No. 14/863,315 , "Non-Final Office Action", dated Feb. 22, 2017, 32 pages.

U.S. Appl. No. 14/863,315 , "Notice of Allowance", dated Nov. 1, 2018, 8 pages.

U.S. Appl. No. 14/871,115 , "Advisory Action", dated Aug. 10, 2018, 7 pages.

U.S. Appl. No. 14/871,115 , "Final Office Action", dated Apr. 19, 2018, 26 pages.

U.S. Appl. No. 14/871,115 , "First Action Interview Office Action Summary—2 Mo", dated Dec. 14, 2017, 5 pages.

U.S. Appl. No. 14/871,115 , "First Action Interview Pilot Program Pre-Interview Communication", dated Oct. 6, 2017, 4 pages.

U.S. Appl. No. 14/871,115 , "Non-Final Office Action", dated Jan. 23, 2019, 31 pages.

U.S. Appl. No. 15/051,523 , "Notice of Allowance", dated Mar. 30, 2017, 7 pages.

Hoffman , "How to Automatically Run Programs and Set Reminders With the Windows Task Scheduler", Available online at: http://www.howtogeek.com/123393/how-to-automatically-run-programs-and-set-reminders-with-the-windows-task-scheduler, Aug. 31, 2012, 7 pages.

International Patent Application No. PCT/US2016/033972 , "International Search Report and Written Opinion", dated Aug. 2, 2016, 14 pages.

International Patent Application No. PCT/US2016/035911 , "International Search Report and Written Opinion", dated Jul. 27, 2016, 11 pages.

Ugale et al., "Location-Based Personal Task Reminder for Mobile Users in Wireless College Campus Environment (Indoor and Outdoor)", International Journal of Computer Techniques, vol. 2, No. 1, Jan. 1, 2015, 7 pages.

\* cited by examiner

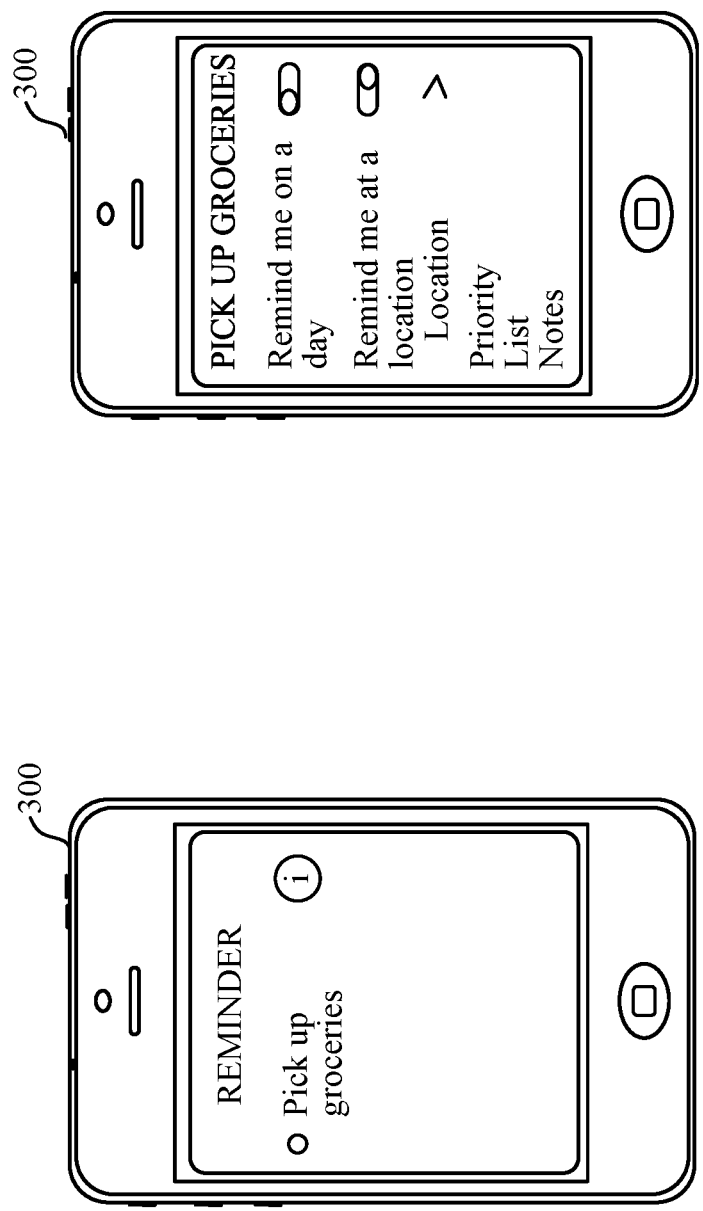

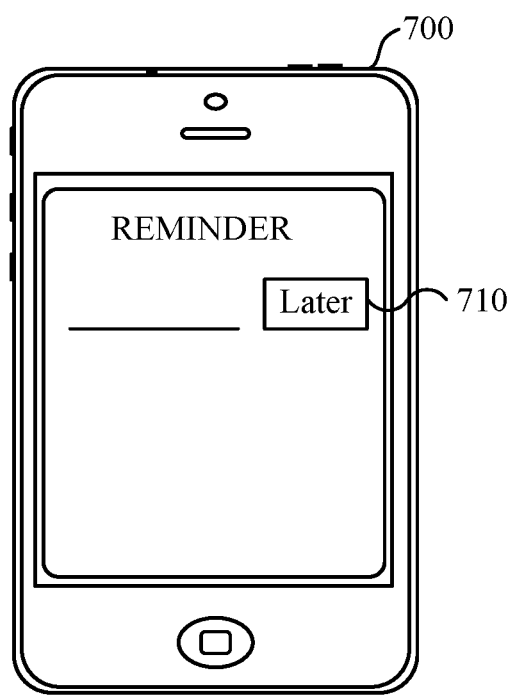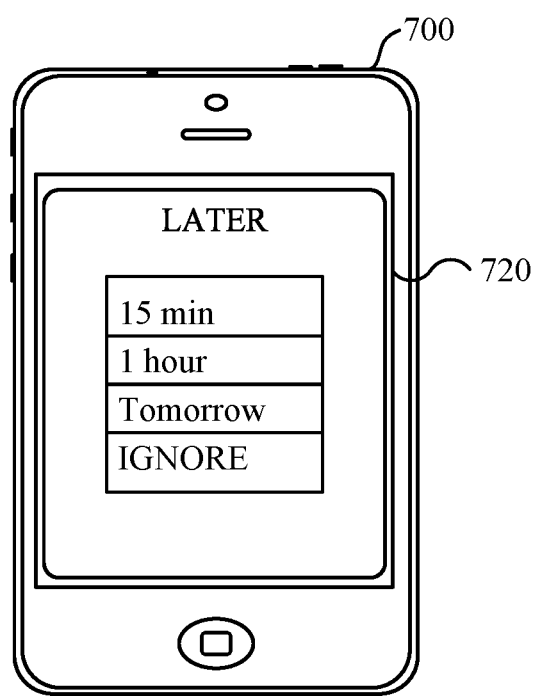
*FIG. 7A*  *FIG. 7B*

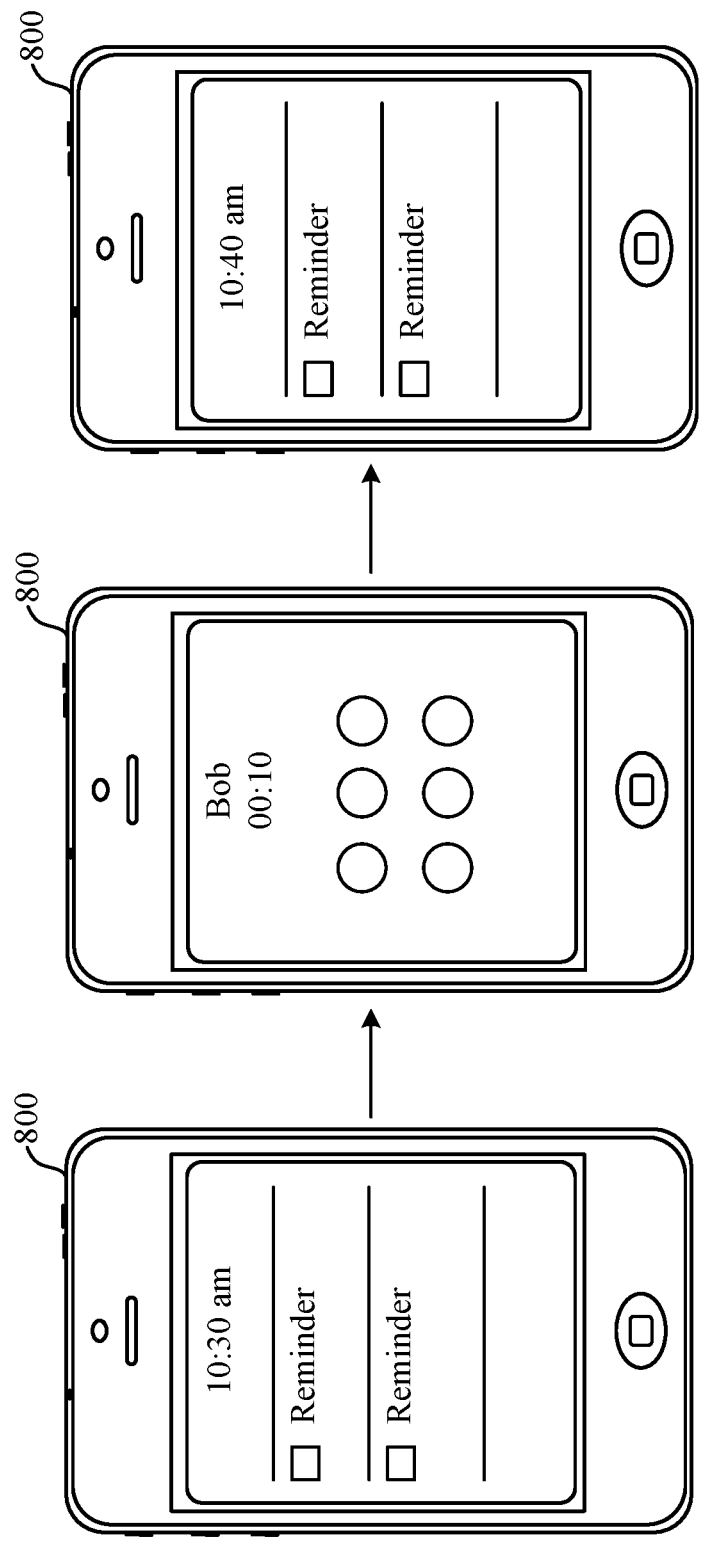

SMART LOCATION-BASED REMINDERS

CROSS-REFERENCES TO RELATED APPLICATIONS

This application is a Continuation of U.S. application Ser. No. 14/863,315, filed Sep. 23, 2015, which claims the benefit of and priority to U.S. Provisional Application No. 62/171,925 entitled "Smart Location-Based Reminders," filed Jun. 5, 2015; and U.S. application Ser. No. 14/732,635 entitled "User Settlement Detection" by Adler et al. filed Jun. 5, 2015, the entire contents of which are incorporated herein by reference for all purposes.

FIELD

The described embodiments relate generally to reminders for devices. More particularly, the present embodiments relates to smart reminders which are provided in response to trigger conditions.

BACKGROUND

Devices, such as mobile phones, provide the user with the ability to set location-based reminders. Location-based reminders provide a user with notifications of, for examples, tasks and errands to be completed at a later day or time. However, a reminder is often overlooked since a user has to be reminded at an opportune time or the user has to continuously look at their device in order to be reminded.

Specifically, a location-based reminder is provided to a user when the mobile device (e.g., a phone) crosses a geo-fence. But, this can be problematic as the user may not be in a position to see or use the reminder. For example, a reminder which is set to trigger when the mobile device has arrived at a user's home, may be provided to a user as soon as the user enters their driveway. However, the user is not in a position to review the reminder at that time.

SUMMARY

The exemplary embodiments provide devices and methods for providing location-based reminders to a user of a device. In some exemplary embodiments, smart reminder triggers can determine an appropriate time at which a reminder should be sent to a user so that the reminder is effectively used.

Specifically, exemplary embodiments do not automatically provide the reminder to the user when the device crosses a geo-fence. Instead, embodiments can use other information (e.g., motion sensors) to determine when to send the reminder. For example, the mobile device can track the state of the person to determine when the mobile device is arrived and settled at a particular location. A reminder application can allow a user or server to select whether a particular reminder is to use the delayed trigger.

Other embodiments are directed to systems, portable consumer devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIGS. 3A, 3B, 3C and 3D illustrate input of the location-based reminder via a user interface according to an exemplary embodiment;

FIGS. 7A and 7B are diagrams illustrating a snooze function of the mobile device according to an exemplary embodiment;

FIGS. 8A, 8B, and 8C are diagrams illustrating a reminder sticking to a lock screen in accordance with an exemplary embodiment.

DETAILED DESCRIPTION

When a reminder (e.g. location-based reminder) is provided to a user, a reminder alert or notification appears on the device (e.g., a mobile phone) or the device can emit a sound (i.e. alarm or phone call) in order to notify the user. A location-based reminder is a reminder that is set to be triggered and provided to a user according to a location set by the user or server. For example, a location-based reminder can be set so as to trigger upon arrival at a user's home.

However, the timing of the location-based reminder or alert may not be opportune. The user may be, for example, handling another matter or at a location which is not immediately related to the reminder and is not able to address the reminder at the time. This may cause the user to disregard the reminder or postpone the reminder for a later day or time.

An exemplary embodiment is directed to smart reminders which provide a location-based reminder to a user in response to triggers, therefore providing reminders at a time more likely to be addressed by a user.

I. Providing Smart Location-Based Reminder

Embodiments provide a location-based reminder according to geo-fence and conservative entry information of a device. Therefore, the reminder is triggered not only based on the location of the device, such as a mobile phone, but also based on additional information indicating that the device is arrived and settled at a location.

A. Method

Figure 1:
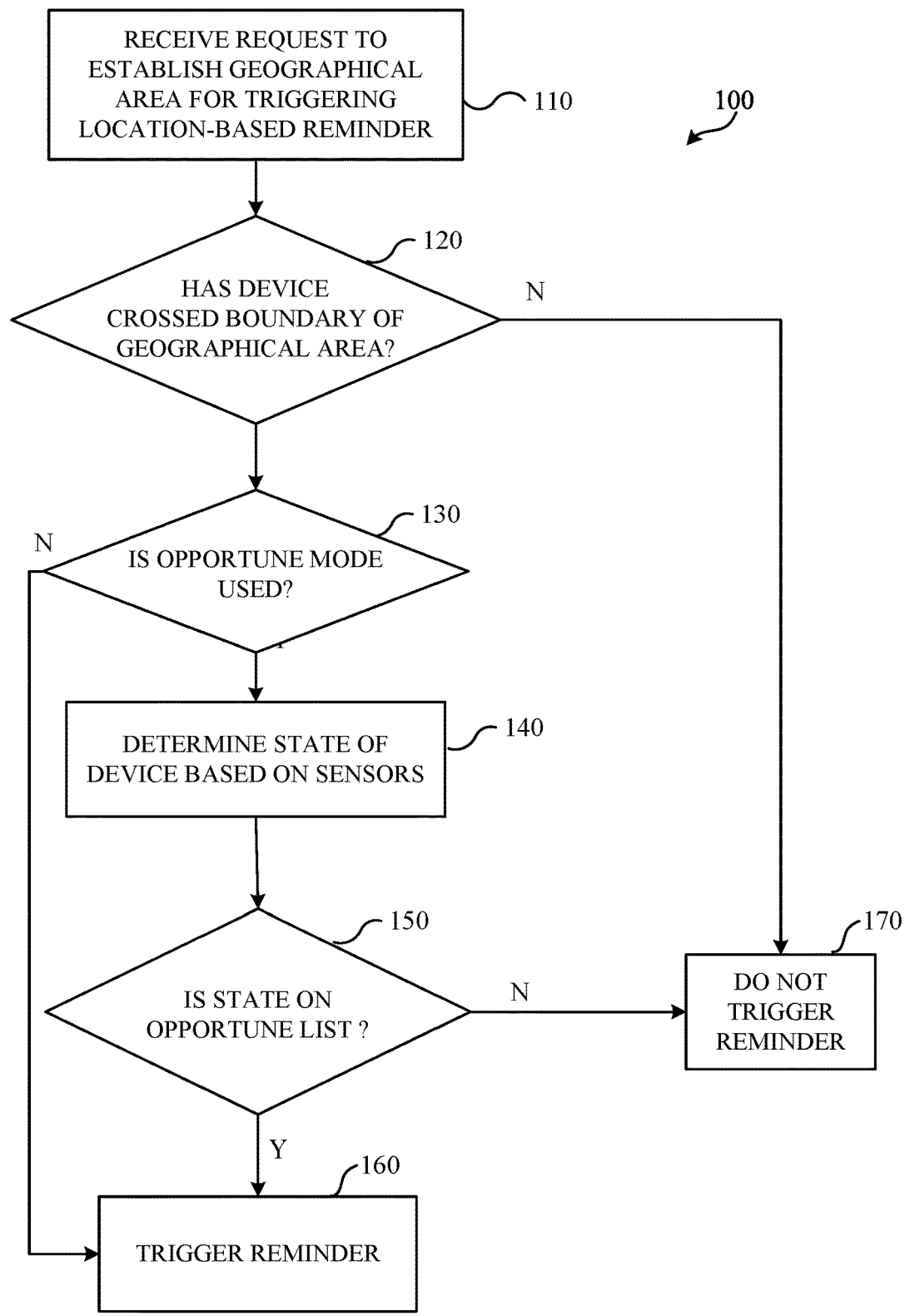
FIG. 1 is a flowchart of a method for providing a location-based reminder according to an exemplary embodiment.

FIG. 1 is a flowchart of a method for providing a location-based reminder according to an exemplary embodiment. Method 100, as shown in FIG. 1, can be performed by a device (e.g., a mobile device, such as a mobile phone, laptop, tablet, or desktop computer).

At step 110, a user creates a reminder on their device. Specifically, the device receives a request from the user to establish a geographical area for triggering a location-based reminder. The request includes a flag which indicates that other sensor information is to be used to determine when to provide the location-based reminder to the user.

The reminder can be created via, for example, voice command or by entering the reminder on a user interface. Although voice command and a user interface are described, the embodiments are not limited to these examples. The setting of the reminder will be described in greater detail below with respect to FIGS. 3A, 3B, 3C, and 3D.

At step 120, it is determined whether the device has crossed a geo-fence. Specifically, the device monitors, using location circuitry, a location of the device to identify whether a geographical area is triggered by the device arriving at a boundary of the geographical area.

A geo-fence is a geographical boundary. Specifically, the geo-fence is a point, line, boundary or geographical area and can be of various shapes and sizes. The geo-fence can be set according to global positioning system (GPS) information, however, a geo-fence is not limited to GPS information and other location services can be used. For example, the user's home or a grocery store can be set as a geo-fence or a boundary of a geographical area. A device has crossed a geo-fence or boundary area when it has reached the boundary area or has gone past the designated boundary area.

The location circuitry can include sensors which can be monitored and fed into a state engine (which may involve various classifiers) that detect a change in state, e.g., that the device has crossed a geo-fence. The current state of the device can also be determined based on measured values from one or more sensors of the device.

Monitoring can also be performed at a server which is in communication with the device. A server can sense via, for example, the use of GPS information, a location of the device. Therefore, a change in the state of the device can be determined.

At step 170, if the device has not crossed the geo-fence, then the reminder is not triggered and therefore the reminder is not sent to the user. Specifically, if the device has not crossed the boundary of the designated geographical area, then it is determined that it is not yet time to trigger the location-based reminder.

At step 130, if the device has crossed the boundary area of a geo-fence, it is determined whether an opportune mode was used for the reminder. Specifically, it is determined whether the user requested that additional information be obtained before triggering the reminder. If the user has not requested that additional information be obtained, then the reminder can be triggered at step 160. That is, if the user has not required entry in an opportune mode before triggering the location-based reminder, then the reminder can be triggered at step 160 after the device has crossed the boundary of the designated geographical area at step 120. However, if the user has requested entry in an opportune mode before triggering the reminder, then the state of the device can be determined.

At step 140, the state of the device can be determined based on sensors. One or more sensors of the device can provide information for determining the state, several states, or a sequence of states of the device in order to determine whether or not the device has entered a trigger state for triggering the reminder. For example, motion sensors and input sensors or a combination of motion sensors and input sensors can be used to detect whether motion activity or input activity has occurred. The motion activity and input activity can be directed to states which indicate that the device has entered an opportune mode for receiving a reminder.

Specifically, the current state of the device can be determined based on measured values from one or more sensors of the device. The sensors can be fed into classifiers to determine classifications for one or more particular categories. For example, a type of motion of the device (e.g., moving, stationary) or a type of input with the device (e.g., selection of button, disconnection) are categories. A classification of the motion or input can provide a state that corresponds to the type of motion and input.

Motion activity can be used to determine when the device has transitioned from a sedentary state (e.g., mobile device is placed in car device holder) to a dynamic state, such as running or walking. Further, if the device is in a static state (e.g., device is sitting in a user's car) and then the device is moved (e.g., beyond a threshold), it can be determined that the device is picked up, and thus it is an opportune time to trigger a reminder. Specifically, several states or a sequence of states can be used to determine whether a reminder should be triggered. Therefore, a sequence of states can include, for example, the device being in a sedentary state and then changing to a state of consistent movement.

As another example, connection and disconnection of the device (e.g. input activity) can be monitored to determine whether it is an opportune time to trigger a reminder. A connection or disconnection of the device from a Bluetooth device or Wi-Fi network can be used to detect whether a connection or disconnection occurs.

Therefore, the state of the device is used to determine whether the device has entered an opportune mode. Various states can be designated by the user of the device. A list of trigger states can be generated including various motion states (e.g., stationary, moving) or input states (e.g. selection of buttons, connection or disconnection) of the device. These are merely examples and different states can be used according to the needs of the user. Further, one state, several states, or a sequence of states can be used to determine whether a device has entered an opportune mode.

At step 150, it is determined whether the state of the device is on an opportune list (also called a trigger list). That is, it is determined whether the state of the device is a state which is opportune for receiving the reminder as requested by the user. The opportune list can be, for example, a list including one or more trigger states which a user has identified as being appropriate for receiving the reminder.

If the state of the device is on an opportune list, at step 160, the location-based reminder can be provided to the user. For example, the user may receive a notification of the reminder, such as a sound alert, a text message, a voice message, an e-mail, or any combination of notifications. In some implementations, the notification can be generated by an application running on the device, e.g., an alarm application or a geo-fence application. A kernel, other system routine, or other application can receive the notification from such an application. Other criteria can be used besides the state being on the opportune list for determining when to provide the reminder. For example, a power level of the device can be considered, other current processing by the device (which may delay providing the reminder, until other more critical processing is finished), or other criteria. Accordingly, the reminder can be provided based on the first state of the mobile device being included in a list of trigger states. Such criteria can also be included in determining a state and whether the state in on the opportune list.

However, if the state of the device is not on the opportune list, or there is no information indicating that the device has more than merely crossed the geographical boundary, then the reminder is not provided to the user at step 170. Therefore, the location-based reminder is not triggered merely by crossing a geo-fence, but additional information is obtained. The determination of an opportune mode will be described in greater detail with respect to FIGS. 5 and 6.

B. Modules

Figure 2:
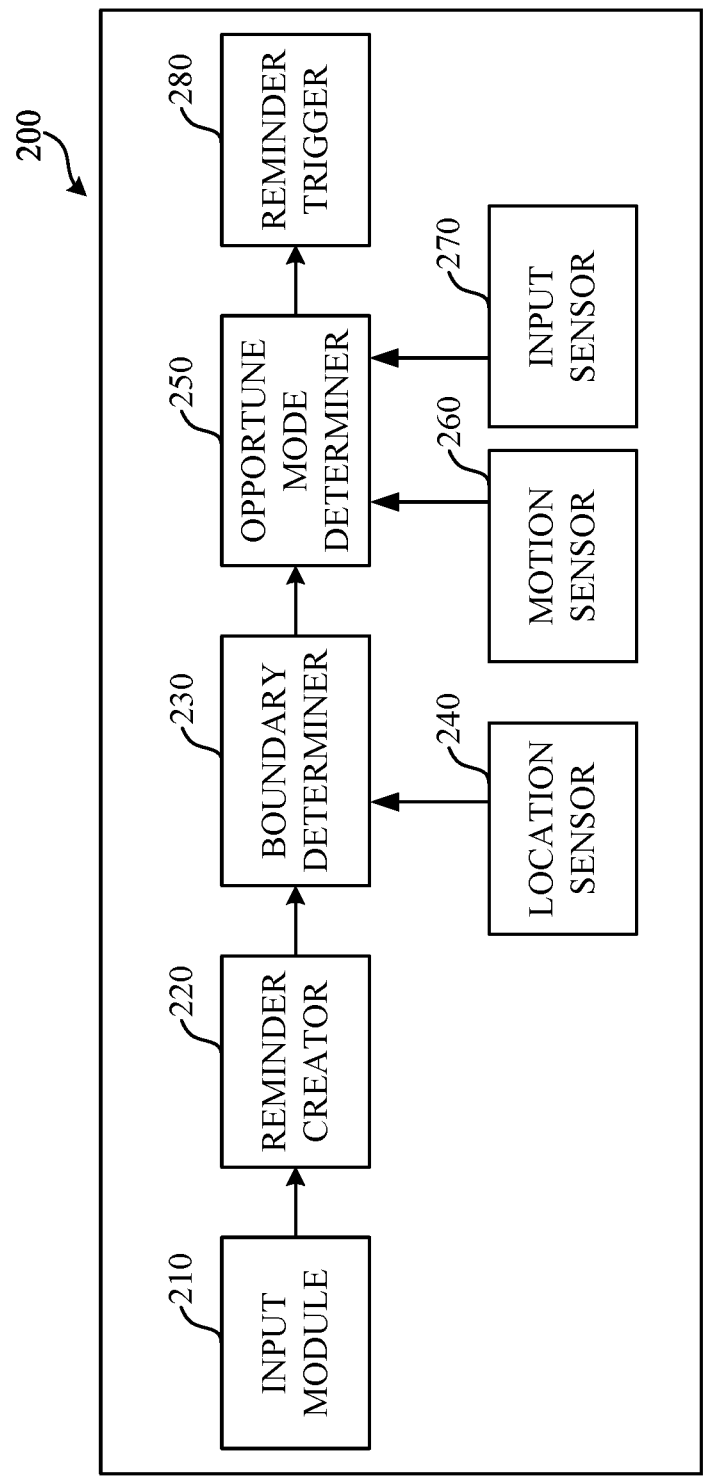
FIG. 2 is a block diagram illustrating a location-based reminder application according to an exemplary embodiment.

FIG. 2 is a block diagram illustrating a location-based reminder application according to an exemplary embodiment. Specifically, FIG. 2 is a block diagram 200 illustrating a location-based reminder application that can execute on a device 200 according to an exemplary embodiment. The modules depicted may be hardware or software modules for analyzing data and providing output information within the device. Reminders can also be created when an application is in an activity state and the reminder can launch the activity state when triggered as disclosed in U.S. Provisional Application No. 62/169,351 directed to "CREATION OF REMINDERS USING ACTIVITY STATE OF AN APPLICATION," which is incorporated by reference in its entirety.

Information for creating a location-based reminder is input in input module 210. Specifically, a user can enter information for creating the reminder, such as content directed to subject of the reminder and location information. The location information can include geographical information of a location for triggering the reminder.

In addition, information as to whether an opportune mode should be entered before triggering a reminder can also be input in the input module 210. Specifically, information can be entered which indicates that additional information should be determined, after a geo-fence has been crossed, before triggering the reminder. The reminder information can be input by, for example, a voice command or a user interface.

The reminder information which is input in input module 210 is sent to reminder creator 220. Reminder creator 220 can be a software module or other construct that can be used to initiate the creation of a location-based reminder. The reminder creator 220 receives the information that is input in the input module 220 for creating a location-based reminder.

For example, a location-based reminder such as "Buy fruit at grocery store" can be created. The reminder includes the description and content of the reminder which was input. In addition, the reminder can include location information of the grocery store from which the user would like to buy the fruit. The location information can include a name of a grocery store or a specific address of a grocery store.

Further, if the user has requested entry of an opportune mode before triggering the reminder, then additional information, such as movement information or input information, can be included in the generated reminder. For example, the reminder can include movement information so that movement of the device after arriving at the designated grocery store (i.e., the device has entered an opportune mode) should occur before triggering the reminder.

As another example, a location-based reminder such as "Get bag out of trunk when I get out of car" can be created. The reminder includes the description and content of the reminder. In addition, the reminder can include location information of the car. The location information can include a general location, such as the user's home address, where the car is located.

If the generated reminder includes entry of an opportune mode before triggering the reminder, then connection and disconnection information between the device and the car can be included in the reminder. For example, the reminder can indicate that the device should be disconnected from a Bluetooth device of the car (i.e., the device has entered an opportune mode) before triggering the reminder.

After creation of the location-based reminder in the reminder creator 210, a boundary determiner 230 determines whether a boundary area has been crossed according to information from a location sensor 240. The location sensor 240 provides location information of the device to the boundary determiner 230. Specifically, the location sensor 240 provides, for example, GPS information of the device.

If the boundary determiner 230 determines that the device has crossed the geographical area which was designated in the reminder creator 210, then the opportune mode determiner 250 determines whether additional information is provided. Specifically, the opportune mode determiner 250 determines whether the device has arrived and is settled at the designated location.

The opportune mode determiner 250 determines whether there is additional information indicating that the device has arrived and is settled at the designated location based on information from, for example, a motion sensor 260 or an input sensor 270.

Although a motion sensor 260 or an input sensor 270 are described, one or more sensors of the device can be used to determine a state of the device. Specifically, a single sensor or various sensors can be used to determine whether the device has entered an opportune mode. Measurements from the sensors can be used by opportune mode determine 250 to determine a state of the device and the measurements can be sent to state classifiers.

The motion sensor 260 determines whether there is movement of the device after crossing the designated geographical area. Specifically, the motion sensor 260 determines whether there is a change in the motion state of the device. For example, the motion sensor 260 detects whether the device has changed from an immobile state (e.g. remaining in a fixed position in a car) to a mobile state (e.g. carried around by a user in a store).

Entry in an opportune mode can also be based on time or a combination of time and motion. For example, the reminder can be set to trigger five (5) minutes after the device arrives at a particular location. Therefore, five minutes after arrival of the device in the grocery store location, the reminder can be triggered. Although five minutes is used an example, other increments of time can be used for triggering the reminder.

As another example, the reminder can be set to trigger five (5) minutes after the device arrives at a particular location and motion is detected. Therefore, five minutes after arrival of the device in the grocery store location and the motion sensor senses that the device is now moving (e.g. that the user is walking around the grocery store), the reminder can be triggered.

The input sensor 270 determines whether there is input activity with the device. For example, the input sensor 270 determines whether the device is in a connected or disconnected state from a Bluetooth device of the vehicle or whether the device is connected to or disconnected from a network, such as a cloud. Further, the input sensor can determine whether an input has been made on the device. For example, the input sensor can detect that the device was initially in a sleeping mode and has changed to an awake mode due to user activity on the device.

Reminder trigger 280 receives information from the opportune mode determiner 250 as to whether a reminder should be triggered. If the opportune mode determiner 250 determines that the device has entered an opportune mode, based on analyzing the information from the motion sensor 260 or input sensor 270, then the reminder trigger 280 can trigger the location-based reminder. However, if the conditions which were set in the reminder (e.g. location and opportune mode) have not been satisfied, then the reminder trigger 280 will not trigger the reminder.

The elements described above are merely examples of the elements which are used to determine whether to trigger a location-based reminder and elements can be removed or added and the order of the elements can be changed as would be clear to one of skill in the art.

II. Reminder Creation

As discussed above, at step 110 of FIG. 1, a location-based reminder is created by the user of the device. Specifically, the device receives a request to establish a geographical area for the device for triggering a location-based reminder. The request includes a flag which indicates that other sensor information (e.g. motion, input) is to be used to determine when to provide the location-based reminder to the user.

A location-based reminder can be input via, for example, a user interface or a voice command. Specifically, the content of the reminder, location information and opportune mode information can be input via a user interface or as a voice command.

A. User Interface

Figure 3D:
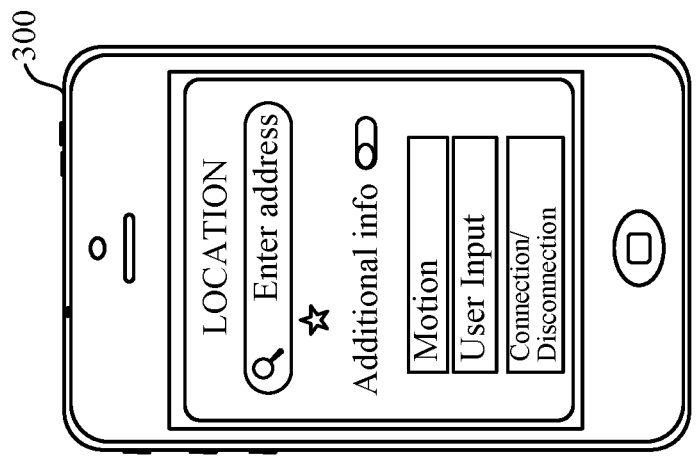

FIGS. 3A, 3B, 3C and 3D illustrate input of the location-based reminder via a user interface according to an exemplary embodiment. As shown in FIG. 3A, the user selects the reminder icon on a user interface of their device 300 (e.g. mobile phone) to create a reminder. The user interface can be, for example, a graphical user interface (GUI).

Figure 3C:
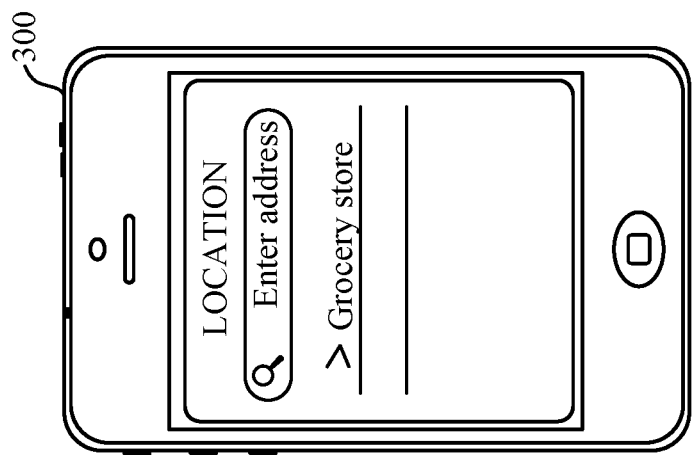

The user can create a reminder to "Buy fruit at the grocery store." If the user is setting a location-based reminder, the user selects the option to trigger the reminder according to a location, as shown in FIG. 3B. By selecting the option to trigger the reminder according to a location, the reminder cannot be triggered until the device has arrived at the designated location. The user subsequently enters the location information of the grocery store information, as shown in FIG. 3C. For example, the user can enter a specific address of a grocery store or the name of a grocery store.

After the user has indicated that the reminder will be based on a location, the user can also indicate that additional information should be determined before triggering the location-based reminder, as shown in FIG. 3D. Specifically, the user can indicate that an opportune mode should be entered before triggering the reminder. For example, the user can indicate that motion information or input information should also be determined before triggering the location-based reminder. The reminder can then be triggered after the selected motion information or input information is detected. In other embodiments, a user can just specify that an opportune mode should be used, and predetermined criteria (e.g. a list of trigger states) selected for the device can determine when a trigger state has been reached. Such predetermined criteria can use a state machine model. In some embodiments, certain states on the trigger list can be added or removed based on statistics of when a user does view the reminder.

FIGS. 3A, 3B, 3C and 3D illustrate an example of creating a location-based reminder according to the exemplary embodiments, however, various methods of entering a location-based reminder can be used and is not limited to the examples described herein.

B. Voice Command

When a user inputs the location-based reminder via audio, such as through a voice command, the user can verbally enter the reminder on their device. For example, the user can select an audio input button on the device, speak into the microphone of the device, and enter a reminder such as "Call Bob when I get to work using opportune mode." Therefore, the reminder can be triggered when the user is at work (i.e., location information) and when the opportune mode requirements have been met.

The device can be aware of the work location based on information which can be input by the user at the time the reminder is created or the work location information can be stored in the device. Further, the user can be asked to select the requirements for entry of an opportune mode or the device may have a default setting regarding a desired opportune mode.

Selection of an audio input button is described, however, any method of inputting audio by a user can be used. Use of a voice command and a user interface for creating a reminder has been described, however, the exemplary embodiments are not limited to these examples and other methods of creating a reminder can be used.

III. Reminder List

Figure 4:
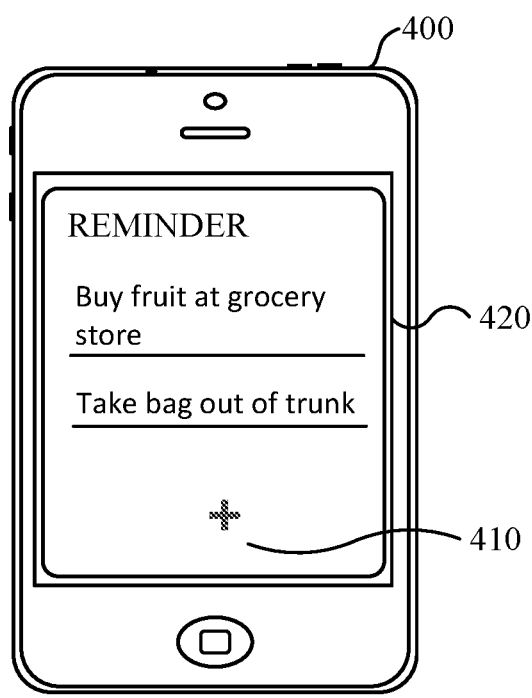
FIG. 4 illustrates a user interface for creating a reminder according to an exemplary embodiment.

In another exemplary embodiment, as shown in FIG. 4, reminders can be easily added to a reminder sheet by selecting an icon on the device 400. FIG. 4 illustrates a user interface for creating a reminder according to an exemplary embodiment. As shown in FIG. 4, a "+" image 410 appears on a reminders sheet 420 of a device 400. A reminder sheet 420 is a page which appears on the user interface which includes reminders created by the user. Therefore, when the user desires to add or create a reminder, the user selects or taps on the "+" image 410 to easily add a reminder to the reminder sheet 420.

Further, since the "+" image 410 continuously appears on the reminder sheet, a reminder can be easily added even if there are numerous reminders on the reminder sheet. Specifically, a user does not have to scroll to the end of the sheet in order to add a reminder. Therefore a reminder, including a location information and opportune mode information, can be created easily and quickly.

Although a "+" image 410 is used in FIG. 4, other images can be used to indicate addition or creation of a reminder, and is not limited to the examples described herein. Further, creation of a reminder can be performed on any device which is capable of creating a reminder including a mobile device (e.g. mobile phone, laptop) and a desktop computer.

IV. Smart Reminder Triggers

As discussed above with respect to FIG. 1, at step 120, it can be determined whether the device has crossed a geo-fence using, for example, GPS information. However, the reminder is not triggered merely when the user reaches the set location or geo-fence for the reminder. As discussed above, conservative entry or arrival and settling is determined. Specifically, the reminder is triggered when it is determined that the device has entered a state which is opportune for receiving the reminder.

Figure 5:
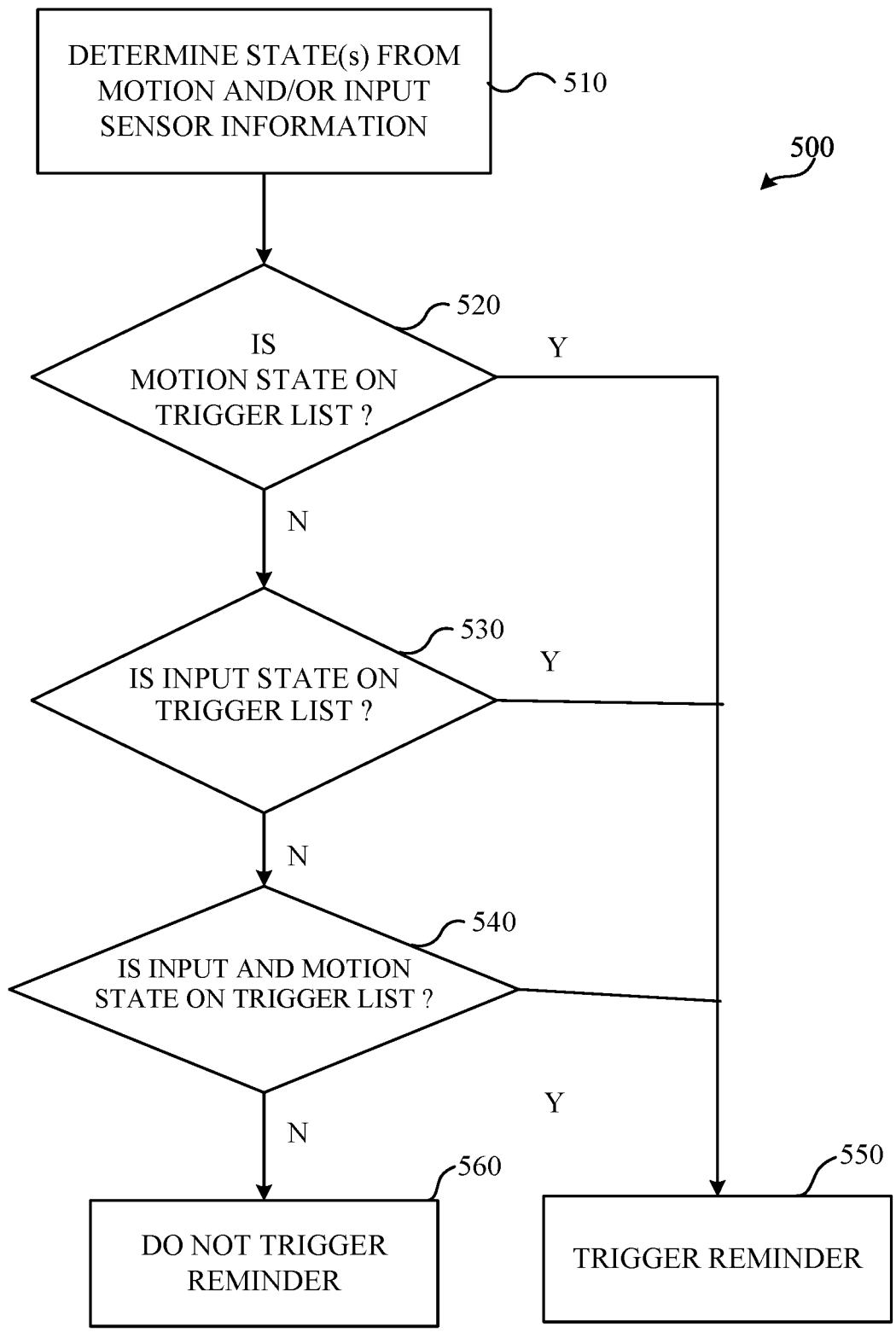
FIG. 5 is a flowchart describing a method of determining entry of an opportune mode according to an exemplary embodiment.
Figure 6:
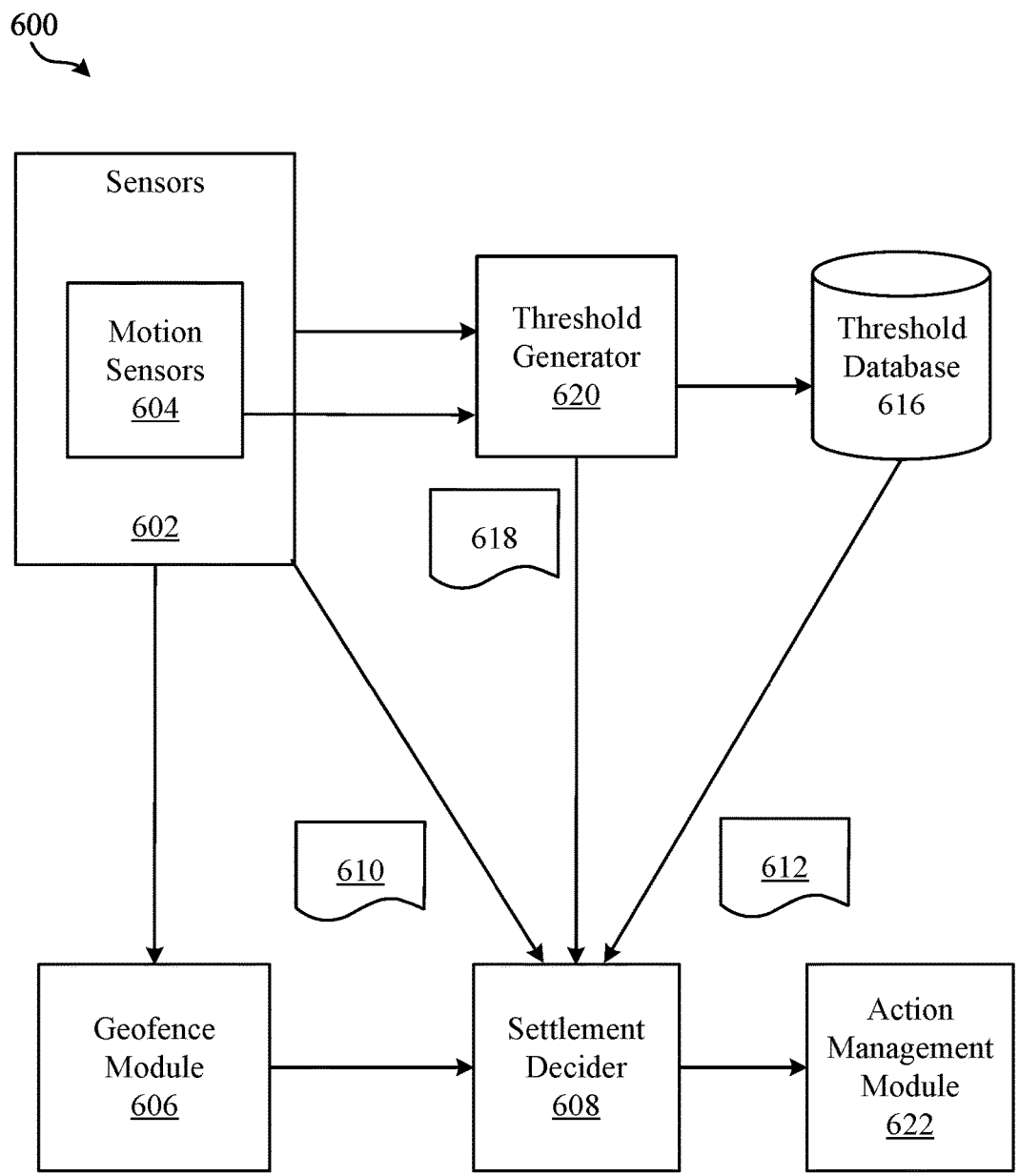
FIG. 6 is a block diagram illustrating components of example mobile device configured to detect entry in an opportune mode according to an exemplary embodiment.

FIGS. 5 and 6 describe step 130 of FIG. 1 in more detail. Specifically, FIG. 5 is a flowchart describing a method of determining entry of an opportune mode according to an exemplary embodiment. FIG. 6 is a block diagram illustrating components of example mobile device configured to detect entry in an opportune mode according to an exemplary embodiment.

A. Method

In the method 500 shown in FIG. 5, at step 510 a state of the device is determined from sensor information generated by sensors. By using the sensor information, the location-based reminder can be triggered at a more opportune time. Specifically, in accordance with an exemplary embodiment, the location-based reminder is not triggered until the device has arrived and is settled.

The conditions for entry in an opportune mode can be determined by a user. For example, if a user creates a reminder to "Purchase fruit at the grocery store" and had additionally requested motion information, input information or a combination of motion information and input information as entry in an opportune mode, then the reminder will not be triggered until the device has arrived at the grocery store and entry in an opportune mode has occurred.

If entry in an opportune mode is conditioned on motion information, at step 520, it is determined whether the detected sensor information includes the requested motion information. Specifically, it is determined whether the motion state of the device satisfies the opportune mode conditions set by the user. The motion information can be used to determine whether the device has arrived and is settled at a location to thus trigger a reminder. The motion sensor can determine whether the device is moving or is stationary. The movement of the device can indicate that the device has not only entered the area of the grocery store, but that the user is now walking throughout the grocery store. When the motion information indicates that the device has arrived and is settled at a particular location (e.g., motion state is on trigger list), then the reminder is triggered in step 550.

A combination of motion information and time information can also be used to determine that a device is arrived and settled at a particular location. For example, a reminder can be triggered when a particular amount of time has passed and when the device senses that there is also motion of the device. Therefore, the reminder would be very beneficial to the user since it is triggered when a user is in a position in which they can likely address the reminder. In addition, reminders can be provided to a user as a user enters or exits a car as disclosed in U.S. application Ser. No. 14/825,754 directed to "REMINDERS BASED ON ENTRY AND EXIT OF VEHICLE," which is incorporated by reference in its entirety.

If entry in an opportune mode is conditioned on input information, at step 530, it is determined whether the detected sensor information includes the requested input information. Specifically, it is determined whether the input activity state of the device satisfies the opportune mode conditions set by the user.

The input information can be used to determine whether a device has settled at a particular location or is leaving a particular location. For example, based on the sensor information, the device can determine whether the device has been connected to or disconnected from devices or programs of a car. As another example, the input information can be used to determine whether the device has changed from a sleeping state to an awake state. Specifically, the input information can be used to determine that the user is now actively using the device (e.g. pressing buttons on the device). When the input information indicates that the device has arrived and is settled at a particular location (i.e. input state is on trigger list), then the reminder is triggered in step 550.

If entry in an opportune mode is conditioned on a combination of motion information and input information, at step 540, it is determined whether the detected sensor information includes the requested motion and input information. Specifically, it is determined whether the motion activity and input activity state of the device satisfies the opportune mode conditions set by the user.

A combination of motion information and input information can be used to determine whether a device has settled at a particular location or is leaving a particular location. That is, several states or a sequence of states can be used. For example, based on the sensor information, the device can determine whether the device is moving or is stationary and has been connected to or disconnected from devices or programs of a car. When the motion information and input information indicates that the device has arrived and is settled at a particular location (i.e. motion state and input state is on trigger list), then the reminder is triggered in step 550. However, if the motion state and the input state is not on the trigger list, then the reminder is not triggered at step 560.

Therefore, a reminder is not triggered merely because the device is in the vicinity of a location, but because additional information is obtained, thus making the reminder more beneficial to the user.

Although states directed to movement and input are described as example states which can be included in a list of states of the device, these are merely examples and other states can be used to determine that the device has arrived and settled at a location. Further, the order of determining the states and the number of states used to determine that the device has arrived and settled at a location can be changed.

For example, vibration information can be used to determine whether the device has arrived and is settled at a location. If the user has created a reminder to remind the user to fasten their seatbelt when they get in their car, the vibration information of the car can be used to release the reminder. Specifically, the vibration of, for example, the engine of the car, is sensed by sensors on the device. The device can then determine that the user is now in the vehicle and is in a position to fasten their seatbelt. Therefore, upon sensing that the user is in the car and has started the car, the reminder to "fasten seatbelt" is triggered.

Further, barometric pressure or atmospheric pressure information can be used to determine whether the device has arrived and is settled at a location. For example, a sensor in the device senses that the pressure in the car has changed because the door has been closed. The device can then determine that the user has now closed the door of the car and is in a position to fasten their seatbelt. Therefore, upon sensing that the user is in the car and has closed the car door, the reminder to "fasten seatbelt" is triggered.

B. Device

One or more sensors of a device can be used to determine a state of the device. For example, motion sensors can determine whether the device is with a user that is running, walking, sedentary, or in a car that is being driven. Measurements from various sensors can be used to determine a state, several states or a sequence of states of the device. A state, several states or a sequence of states of the device can then be used to determine whether to provide a reminder (e.g., a location-based reminder) to a user.

FIG. 6 is a block diagram illustrating components of example mobile device configured to entry in an opportune mode according to an exemplary embodiment. Specifically, FIG. 6 illustrates whether the device has entered a state which is opportune for receiving a location-based reminder.

Mobile device 600 can include, or couple to, sensors 602. Sensors 602 can include, for example, one or more RF receivers, microphones, barometers, light sensors, thermometers, hygrometers. In particular, sensors 602 can include one or more motion sensors 604. Motion sensors 604 can include, for example, one or more gyroscopes, accelerometers or magnetometers.

Mobile device 600 can include geo-fence module 606. Geo-fence module 606 is a component of mobile device 600 configured to determine whether mobile device 600 entered a geo-fenced environment for performing an action using readings from sensors 602. Upon determining that mobile device 600 entered the geo-fenced environment, geo-fence module 606 can send a notification to settlement decider 608 requesting settlement decider 608 to decide whether a user of mobile device 600 has arrived and is settled.

Upon receiving the notification, settlement decider 608 can obtain sensor readings 610 from sensors 602 over a time period. Settlement decider 608 can generate one or more measurement matrices from sensor readings 610. Settlement decider 608 can obtain pre-specified thresholds 612 from threshold database 616. Alternatively or additionally, settlement decider 608 can obtain learned thresholds 618 from threshold generator 620. Threshold database 616 can be a data store on mobile device 600 or located remote from mobile device 600 storing pre-specified thresholds 612. Pre-specified thresholds 612 can include sparsity thresholds, deviation thresholds, duty cycle thresholds or any combination of the above.

Threshold generator 620 can be a component of mobile device 600 configured to determine one or more learned thresholds 618 from readings of sensors 602. In particular, threshold generator 620 can determine deviation thresholds of sensor measurements when motion sensor 604 indicates that mobile device 600 is stationary. Threshold generator 620 can then designate those deviation thresholds as learned thresholds 618. Determining the deviation thresholds of sensor measurements can take place in a time period that is shorter than the time window for determining that the user has arrived and is settled (e.g. opportune mode). Determining the deviation thresholds of sensor measurements can be in real time or can occur at an earlier time. The learned thresholds 618 that were determined at an earlier time can be stored in threshold database 616 for later retrieval.

Upon generating the measurement matrices and obtaining the deviation thresholds, settlement decider 608 can determine whether a user has arrived and is settled down. Upon determining that user has arrived and is settled, settlement decider 608 can notify action management module 622. Action management module 622 is a component of mobile device 600 configured to perform the action associated with a geo-fence upon receiving a notification from settlement decider 608.

Determining whether the device has entered an opportune mode can be performed by using wireless access points. For example, the mobile device 600 can include a radio frequency (RF) signal receiver. The RF receiver can detect RF signals from wireless access points. The signals can encode respective identifiers from wireless access points. In some implementations, the identifiers can be a media access control (MAC) address of a respective wireless access point.

Also, mobile device 600 can record readings of the RF receiver. The readings can include measurements of the RF signals. The measurements can include, for example, a respective received signal strength indicator (RSSI) for each signal. The mobile device 600 can record the readings at times k, k+1, k+2 and so on. Time k can be an arbitrary time. Time k+1 can be time k plus a discrete interval (e.g., one second, five second or ten seconds). Mobile device 600 can designate measurements m at a time k as observation vector $z_k$. Observation vector $z_k$ can have a number of elements corresponding to a number of wireless access points n detected by the receiver at time k, where each element in the vector $z_k$ is a measurement of a signal from a different wireless access point i. A measurement matrix ($M_{k,i}$) which can be used is a q×n matrix that can be constructed from observation vectors $z_k$ as follows:

$$M_{k,i} = \begin{bmatrix} m_{1,1} & m_{1,2} & \cdots & m_{1,n} \\ m_{2,1} & m_{2,2} & \cdots & m_{2,n} \\ \vdots & \vdots & \vdots & \vdots \\ m_{q,1} & m_{q,2} & \cdots & m_{q,n} \end{bmatrix} \quad [1]$$

where the ith wireless access point measurement m is measured at the kth measurement time, i=1, 2, 3 . . . n, k=1, 2, 3 . . . q, n is a positive integer equal to the total number of wireless access points and q is a positive integer equal to the total number of measurement times in a measurement window W. The window W represents the total amount of time it takes for the user to settle down in a geo-fenced environment. This matrix may be sparse, for example, when the mobile device 600 is not settled state and moves from one location to another, observing different access points.

For example, mobile device 600 may measure access points signals from AP1, AP2 and AP3 at time k, and access point signals AP2, AP3, AP4 and AP5 at time k+1, where each of AP1 through AP5 is an identifier (e.g., MAC address) of a respective access point. Mobile device 600 can assign each distinct access point to a distinct column in the measurement matrix.

In some implementations, each element of the measurement matrix can be signal measurement (e.g., RSSI in dBm) of a corresponding wireless access point at a corresponding time. Mobile device 600 can determine whether the user has arrived and is settled using the measurement matrix. In some implementations, mobile device 600 can determine that a user has arrived and is settled upon determining that the measurements m in the measurement matrix satisfy one or more of (1) a deviation threshold, (2) a sparsity threshold or (3) a duty cycle threshold.

1. Deviation Threshold

In some implementations, mobile device 600 can determine an expected value $E[X_i]$ and standard deviation $\sigma i$ for a measurement of an RF signal transmitted by wireless access point i, where $X_i$ is the measurement (e.g., RSSI in dBm) of wireless access point i. Mobile device 600 can create a vector $[\sigma_{t1} \ldots \sigma_{ti} \ldots \sigma_{tm}]$ of deviation threshold for each wireless access point i. In some implementations, the vector elements $[\sigma_{t1} \ldots \sigma_{ti} \ldots \sigma_{tm}]$ can be pre-specified (e.g., $\sigma_{t1}=\sigma_{ti}=\sigma_{tm}=5$ dBm). In some implementations, mobile device 600 can determine the vector elements $[\sigma_{t1}, \ldots \sigma_{ti}, \ldots \sigma_{tm}]$ by measuring standard deviations of the measurements during a time period p when a motion sensor (e.g., an accelerometer or gyro rate sensor) indicates that mobile device 600 is stationary. Time period p may be the same as or shorter than time window W. Mobile device 600 can calculate deviation thresholds deviations $[\sigma_{t1}, \ldots \sigma_{ti}, \ldots \sigma_{tm}]$ of the measurements at time period p when the motion sensor indicates that mobile device 600 is stationary. Mobile device 600 can determine that the measurement matrix satisfies the deviation threshold upon determining each standard deviation $\sigma i$ for wireless access point i is less than the corresponding deviation threshold for wireless access point i ($\sigma_{ti}$).

2. Sparsity Threshold

In some implementations, mobile device 600 can determine a sparsity S of a measurement matrix. Mobile device 600 can determine that the measurement matrix is sparse upon determining that the sparsity S is smaller than a predefined value. The predefined value can be determined by mobile device 600 using a supervised or unsupervised learning scheme. More particularly, mobile device 600 can determine the sparsity S by determining the number of elements of the measurement matrix that are null or zero. Mobile device 600 can then determine the sparsity S by dividing the number of null or zero elements by the size of the measurement matrix, which in Equation [1] is a q×n matrix. Mobile device 600 can designate as null or zero an element in the measurement matrix corresponding to wireless access point APi at measurement time k+1 when, for example, the access point APi is detected at measurement time k but not detected at measurement time k+1.

3. Duty Cycle Threshold

In some implementations, mobile device 600 can determine a respective duty cycle Di for each access point APi (i=1, 2, 3, . . . n) represented in the measurement matrix. For example, mobile device 600 can obtain a pre-specified or calculated duty cycle threshold (e.g., 80 percent). Mobile device 600 can determine that the measurement matrix satisfies the duty cycle threshold if each duty cycle Di is greater than the duty cycle threshold $d_{ti}$. Mobile device 600 can determine the duty cycle Di by dividing the time wireless access point i is detected by the total time. In particular, for example, if mobile device 600 detects a particular access point i m times in the q periods, mobile device 600 can designate the ratio m over q as the duty ratio, as shown below in Equation [2].

$$D_i = \frac{m}{q} > d_{ti} \quad [2]$$

Further, determining whether a device has arrived and is settled can also be performed by using ambient sound. Mobile device 600 can include a microphone which can be used to record ambient sound at various times k, k+1, k+2 and so on. Each recording can last a specified time period (e.g., 0.1 seconds). Mobile device 600 can convert the sound to the frequency domain using, for example, a Fast Fourier Transform (FFT) on each recording. Mobile device 600 can determine a respective frequency spectrum for each recording.

Mobile device 600 can determine measurement matrix for the ambient sound measurements. The measurement matrix can have a time dimension including measurement times k, k+1, k+2 and so on. The measurement matrix can have a frequency dimension that corresponds to a list of frequencies, e.g., 100 Hz, 500 Hz, 2.5 k Hz, etc. Each respective ambient sound measurement in frequency Fi at measurement time k can be a power level in decibel (dB).

Mobile device 600 can determine an expected power level E[Pi] and a standard deviation of the power level σi for each frequency Fi. Mobile device 600 can determine that a user is arrived and has settled down when each standard deviation σi satisfies a corresponding sound deviation threshold $\sigma_{ti}$. In some implementations, mobile device 600 can assign each sound deviation threshold $\sigma_{ti}$ using a pre-specified value (e.g., 10 dB). In some implementations, mobile device 600 can determine each sound deviation threshold $\sigma_{ti}$ using standard deviations of measurements recorded by a microphone of the mobile device at a time when a motion sensor of mobile device 600 indicates that mobile device 600 is stationary.

Settlement detection using RF signals and sound levels has been described above. A mobile device 600 can use other sensor readings, e.g., barometer readings, light sensor readings, hygrometer readings or thermometer readings to determine whether a user has arrived and is settled. In some implementations, mobile device 600 can determine whether a user has entered an opportune mode using weighted voting of the threshold calculations from various sensor readings.

V. Snooze Function

When a reminder is triggered and a user does not want to or cannot address the reminder at the time, the user will often select to ignore the reminder. However, by ignoring the triggered reminder, the purpose of the reminder is defeated.

Therefore, exemplary embodiments provide enhanced snoozing capabilities thereby providing a reminder at an opportune time for a user. FIGS. 7A and 7B are diagrams illustrating a snooze function of the device 700 according to an exemplary embodiment. As shown in FIG. 7A, when a reminder is triggered, the user is provided the option of selecting a later button 710 which allows the user to postpone the reminder. If a user selects the later button 710, a later screen 720 appears. A user can then select the option of snoozing the reminder to a later time, such as in 15 minutes, one hour, tomorrow, or the user can select to ignore the reminder. If the user chooses to ignore the reminder, then the reminder will no longer be provided to the user.

Therefore, through use of the later screen, the user is given the option of snoozing the reminder at a later time and receive the reminder at a time which is more opportune for the user. However, if the user desires to ignore the reminder, the user can ignore the reminder by selecting the ignore button on the later screen. However, by requiring the additional step of the later screen before selecting the ignore button, the user cannot immediately disregard the reminder. By providing these options, a user is less likely to ignore or disregard a reminder.

Further, in accordance with exemplary embodiments, the reminder can be snoozed to a later time which is convenient for a user. When snoozing the reminder, the user is asked to enter additional information as to when they would like the snooze to end and for the reminder to re-appear. For example, the user can place the reminder in a snooze mode until a free time is detected on the calendar of the user or the device senses that the user is currently not performing an activity on the device and is therefore available to address the reminder.

VI. Stick to Lock Screen

In accordance with another exemplary embodiment, a reminder can remain or stick to a lock screen even when the device 800 is unlocked, as shown in FIGS. 8A, 8B and 8C. FIGS. 8A, 8B and 8C are diagrams illustrating a reminder sticking to a lock screen in accordance with an exemplary embodiment.

A user can set a reminder to appear on the lock screen of the device 800 (e.g., a mobile phone). When a reminder is triggered and a user is not currently using the 800 or the user does not want to address the reminder at that time, the reminder can appear on a lock screen of the device 800, as shown in FIG. 8A, until the reminder is addressed by the user. The lock screen of a device 800 is the screen of the device 800 which is currently in a locked state. The screen can be unlocked be entering information, such as a password.

However, the user may receive a call even though the user has not addressed a reminders which is appearing on their lock screen. In order to answer the call, the user unlocks the device 800, as shown in FIG. 8B. In accordance with an exemplary embodiment, after the user has completed their phone call and their device is again locked, the reminders can continue to remain on the lock screen or stick to the lock screen, as shown in FIG. 8C.

Therefore, even if the user unlocks their device, the reminders can still remain or stick to the lock screen, even though they have unlocked their device, until the user has addressed the reminder. Consequently, the reminder will not be lost when the user unlocks their screen.

Although location-based reminders have been discussed above, the exemplary embodiments can be applied to various kinds of reminders, and not only location-based reminders, which are available on a device.

VII. Example Device

Figure 9:
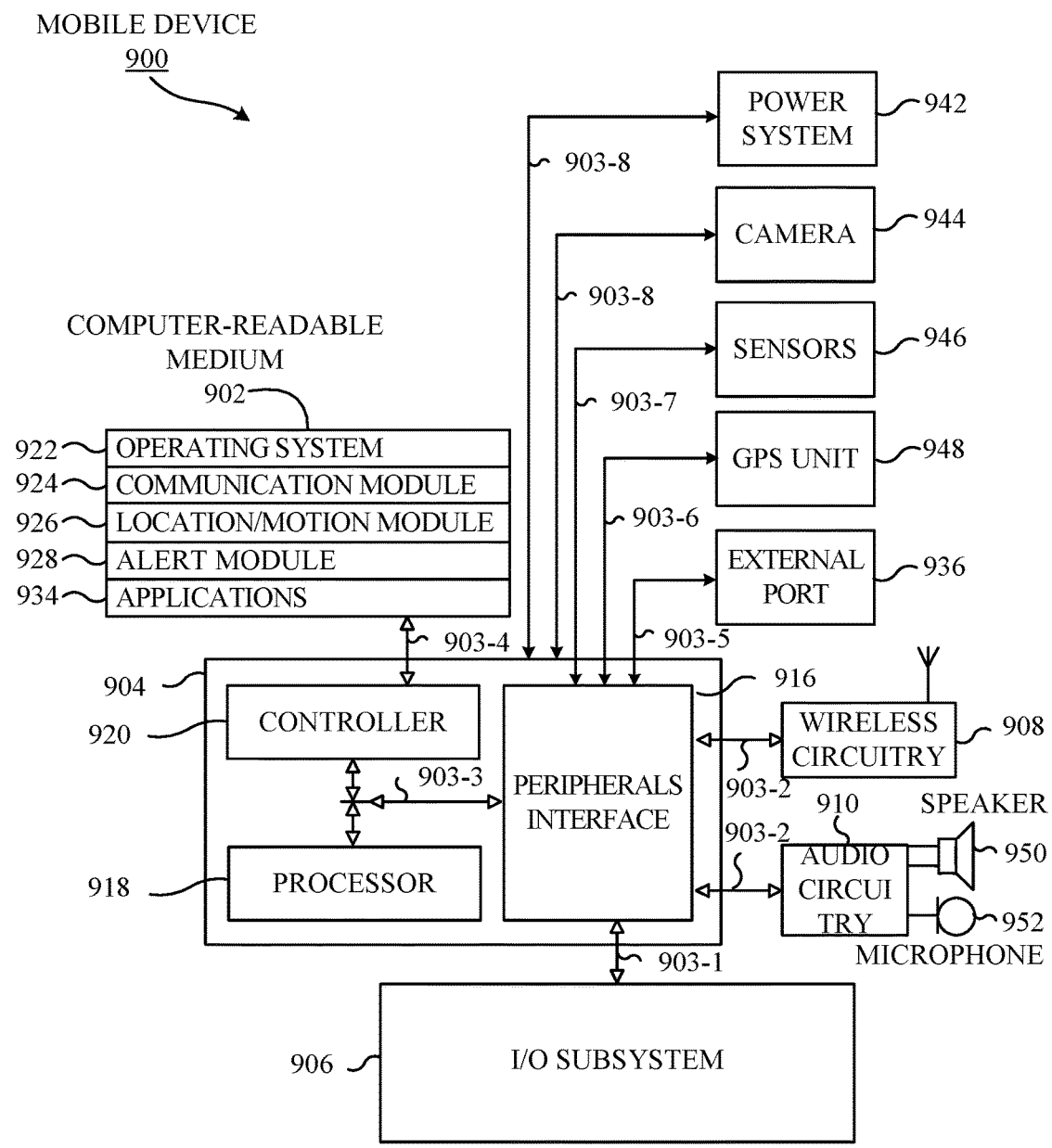
FIG. 9 is a block diagram of an example device according to an exemplary embodiment.

FIG. 9 is a block diagram of an example device according to an exemplary embodiment. Specifically, FIG. 9 is a block diagram of an example device 900, which may be a mobile device. Device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 908 can use various protocols, e.g., as described herein.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, an alert module 928, and other applications (or set of instructions) 934, such as a car locator app and a navigation app.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 60-pin connector, etc.) is adapted for coupling directly to other devices or indirectly over a network (e.g., the Internet, wireless LAN, etc.).

Location/motion module 926 can assist in determining the current position (e.g., coordinates or other geographic location identifier) and motion of device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Alert module 928 (or alert system) can include various sub-modules or systems, e.g., as described above in FIGS. 3 and 6.

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or track pad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method for providing a reminder to a user of a mobile device, the method comprising, at the mobile device:
    monitoring, using location circuitry, a location of the mobile device to identify whether the mobile device crosses a first geographical boundary of a first geographical area;
    after identifying that the mobile device crosses the first geographical boundary of the first geographical area:
        identifying a first location-based reminder;
        determining whether an opportune event occurs, wherein the opportune event is determined to occur based on motion sensor information indicating a change of the mobile device from a first motion state to a second motion state, wherein the second motion state is a state that the mobile device is in a position that a user is able to review the first location-based reminder; and
        providing the first location-based reminder to the user in response to determining that the opportune event occurred.

2. The method according to claim 1, wherein the mobile device crosses the first geographical boundary of the first geographical area in response to the mobile device crossing a geo-fence.

3. The method according to claim 2, wherein the geo-fence is set in accordance with global positioning system (GPS) information.

4. The method according to claim 1, wherein the motion sensor information is monitored by a state engine that detects the change in a motion state of the mobile device from the first motion state to the second motion state.

5. The method according to claim 1, wherein the second motion state is determined based on vibration motion information.

6. The method according to claim 1, wherein the second motion state comprises movement above a movement threshold.

7. The method according to claim 6, wherein the movement threshold is determined by a threshold generator.

8. The method according to claim 7, wherein the threshold generator is configured to determine the movement threshold based on readings from one or motion sensors.

9. The method according to claim 1, wherein the first location-based reminder is input by a voice command.

10. The method according to claim 1, wherein the first location-based reminder is displayed on a lock screen of the mobile device until the first location-based reminder is addressed by the user.

11. The method according to claim 1, further comprising:
    in response to receiving a snooze input;
    providing an option to trigger the first location-based reminder at a later time; and
    in response to receiving an input to trigger the first location-based reminder at the later time, providing a plurality of options for triggering the first location-based reminder at the later time.

12. The method according to claim 1, wherein the second motion state comprises a state in which the mobile device is picked up by a user.

13. The method according to claim 1, wherein the second motion state comprises a state in which the mobile device receives a selection of one or more inputs on the mobile device.

14. A computer product comprising a non-transitory computer readable medium storing a plurality of instructions that when executed control a computer system to provide a reminder to a user of a mobile device, the instructions comprising:
    monitoring, using location circuitry, a location of the mobile device to identify whether the mobile device crosses a first geographical boundary of a first geographical area;
    after identifying that the mobile device crosses the first geographical boundary of the first geographical area:
        identifying a first location-based reminder;
        determining whether an opportune event occurs, wherein the opportune event is determined to occur based on motion sensor information indicating a change of the mobile device from a first motion state to a second motion state, wherein the second motion state is a state that the mobile device is in a position that a user is able to review the first location-based reminder; and
        providing the first location-based reminder to the user in response to determining that the opportune event occurred.

15. The computer product according to claim 14, wherein the mobile device crosses the first geographical boundary of the first geographical area in response to the mobile device crossing a geo-fence.

16. The computer product according to claim 14, wherein the motion sensor information is monitored by a state engine that detects the change in a motion state of the mobile device from the first motion state to the second motion state.

17. The computer product according to claim 14, wherein the second motion state comprises movement above a movement threshold.

18. The computer product according to claim 17, wherein the movement threshold is determined by a threshold generator.

19. The computer product according to claim 18, wherein the threshold generator is configured to determine the movement threshold based on readings from one or motion sensors.

20. A mobile device comprising:
    one or more sensors;
    one or more processors configured to:
        monitor, using location circuitry, a location of the mobile device to identify whether the mobile device crosses a first geographical boundary of a first geographical area;
        after identifying that the mobile device crosses the first geographical boundary of the first geographical area:
            identify a first location-based reminder;
            determine whether an opportune event occurs, wherein the opportune event is determined to occur based on motion sensor information indicating a change of the mobile device from a first motion state to a second motion state, wherein the second motion state is a state that the mobile device is in a position that a user is able to review the first location-based reminder; and providing the first location-based reminder to the user in response to determining that the opportune event occurred.

* * * * *

UNITED STATES PATENT AND TRADEMARK OFFICE
CERTIFICATE OF CORRECTION

PATENT NO. : 10,475,327 B2
APPLICATION NO. : 16/295480
DATED : November 12, 2019
INVENTOR(S) : Scott Adler and Viktor Miladinov It is certified that error appears in the above-identified patent and that said Letters Patent is hereby corrected as shown below:

In the Specification

Column 5, Line 36; delete "input module 220" and insert --input module 210--.

Column 5, Line 67; delete "reminder creator 210" and insert --reminder creator 220--.

Column 6, Line 8; delete "reminder creator 210" and insert --reminder creator 220--.

Signed and Sealed this
Third Day of March, 2020

Andrei Iancu
*Director of the United States Patent and Trademark Office*